United States Patent
Zhang

(10) Patent No.: US 10,462,026 B1
(45) Date of Patent: Oct. 29, 2019

(54) PROBABILISTIC CLASSIFYING SYSTEM AND METHOD FOR A DISTRIBUTED COMPUTING ENVIRONMENT

(71) Applicant: VCE Company, LLC, Richardson, TX (US)

(72) Inventor: Ying Victor Zhang, Plano, TX (US)

(*) Notice: Subject to any disclaimer, the term of this patent is extended or adjusted under 35 U.S.C. 154(b) by 288 days.

(21) Appl. No.: 15/244,290

(22) Filed: Aug. 23, 2016

(51) Int. Cl.
  *G06F 15/173* (2006.01)
  *H04L 12/26* (2006.01)
  *H04L 29/08* (2006.01)

(52) U.S. Cl.
  CPC ............. *H04L 43/08* (2013.01); *H04L 43/04* (2013.01); *H04L 43/10* (2013.01); *H04L 67/10* (2013.01)

(58) Field of Classification Search
  CPC ......... H04L 43/08; H04L 43/04; H04L 43/10; H04L 67/10
  USPC ........................................................ 709/224
  See application file for complete search history.

(56) References Cited

U.S. PATENT DOCUMENTS

| | | | | |
|---|---|---|---|---|
| 2011/0173027 A1* | 7/2011 | Olszewski | ............. | G06Q 50/22 705/2 |
| 2011/0238611 A1* | 9/2011 | McSherry | ................ | G06N 5/04 706/52 |
| 2013/0239107 A1* | 9/2013 | Zadka | ..................... | G06F 9/455 718/1 |
| 2014/0114890 A1* | 4/2014 | Fujimaki | ................ | G06N 20/00 706/12 |
| 2014/0278335 A1* | 9/2014 | Macaro | .................. | G06N 7/005 703/21 |
| 2014/0330536 A1* | 11/2014 | Chen | ........................ | G06F 17/18 702/181 |
| 2016/0155098 A1* | 6/2016 | McElhinney | ....... | G06F 11/0751 705/305 |
| 2016/0337226 A1* | 11/2016 | Padala | .................... | H04L 43/10 |

* cited by examiner

*Primary Examiner* — Atta Khan
(74) *Attorney, Agent, or Firm* — Polsinelli PC

(57) ABSTRACT

A probabilistic classifying system for a distributed computing environment includes a computer-executable system for obtaining multiple measured values associated with the operation of a plurality of resources of a distributed computing environment. The system uses the measured values to generate a health metric assessment using a probabilistic classifier in which the health metric assessment comprising one of multiple finite health metric assessments. The probabilistic classifier generates the health metric assessment according to the obtained measured values and a statistical inference upon at least a portion of a plurality of previously obtained measured values of the resources of the distributed computing environment.

17 Claims, 7 Drawing Sheets

US 10,462,026 B1

PROBABILISTIC CLASSIFYING SYSTEM AND METHOD FOR A DISTRIBUTED COMPUTING ENVIRONMENT

TECHNICAL FIELD

Aspects of the present disclosure relate to computing devices and, in particular, to a probabilistic classifying system and method for a distributed computing environment.

BACKGROUND

Computing environments used by enterprises, such as corporations and universities, are often provided by multiple computing devices in a distributed computing environment that allows the devices to function in a collaborative manner to meet the computing resource needs of the enterprise. Applications may be deployed in these distributed computing environments such that the workload of the applications are distributed across numerous computing devices for various reasons that may include enhanced performance, augmented security, increased availability, and scalability. Nevertheless, the performance, security, availability, and scalability of the distributed computing environments may be difficult to maintain when multiple diverse applications are deployed in these distributed computing environments.

SUMMARY

According to one aspect of the present disclosure, a probabilistic classifying system for a distributed computing environment includes a computer-executable system for obtaining multiple measured values associated with the operation of a plurality of resources of a distributed computing environment. The system uses the measured values to generate a health metric assessment using a probabilistic classifier in which the health metric assessment comprising one of multiple finite health metric assessments. The probabilistic classifier generates the health metric assessment according to the obtained measured values and a statistical inference upon at least a portion of a plurality of previously obtained measured values of the distributed computing environment.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide a probabilistic classifying system that classifies the resources of a distributed computing environment in one of multiple finite heath states according to measured information obtained about those resources. Whereas traditional health assessment techniques used for monitoring the health of the resources of a distributed computing environment have involved rule-based algorithms, or hard coding metric monitoring techniques, they are relatively difficult to maintain due to the ever changing nature of modern distributed computing environments in which the hardware resources as well as applications may be continually updated, modified, and/or replaced. Embodiments of the present disclosure provide a solution to this problem, among others, through a computing system that generates a health metric assessment using a statistical inference technique that calculates the health metric assessment using measured values along with a probabilistic model calculated from previously obtained measured values.

A distributed computing environment, which may include a converged infrastructure or other type of distributed computing architecture, is often composed of components from various vendors, and due to its criticality and complexity, often requires management solutions that, in real-time, provide an overall health of the distributed computing environment or a specified portion of the distributed computing environment. However, because many distributed computing environments often involve the use of a large number of components with a wide range of heterogeneity, no elegant computation calculation exists that can accurately provide its health status in real-time. Additionally, the health status of the distributed computing environment, or a portion of the components of the distributed computing environment, may be perceived differently by different users. For example, one user may employ the use of one application that is computationally intensive while another user may employ the use of another application that is storage intensive. As such, a healthy distributed computing environment used by the first user may experience relatively large processing load, while experiencing relatively little memory usage. Conversely, a healthy distributed computing environment used by the second user may experience relatively little processing load, while experiencing relatively large amounts of memory usage. Therefore, the overall health of the distributed computing environment or a portion of the resources of the distributed computing environment is often dependent upon the user's perception and the type and nature of applications executed on the resources of the distributed computing environment. Nevertheless, accurate monitoring and mitigation of the health aspects of the distributed computing environment has been difficult to achieve using traditional health monitoring techniques.

Figure 1A:
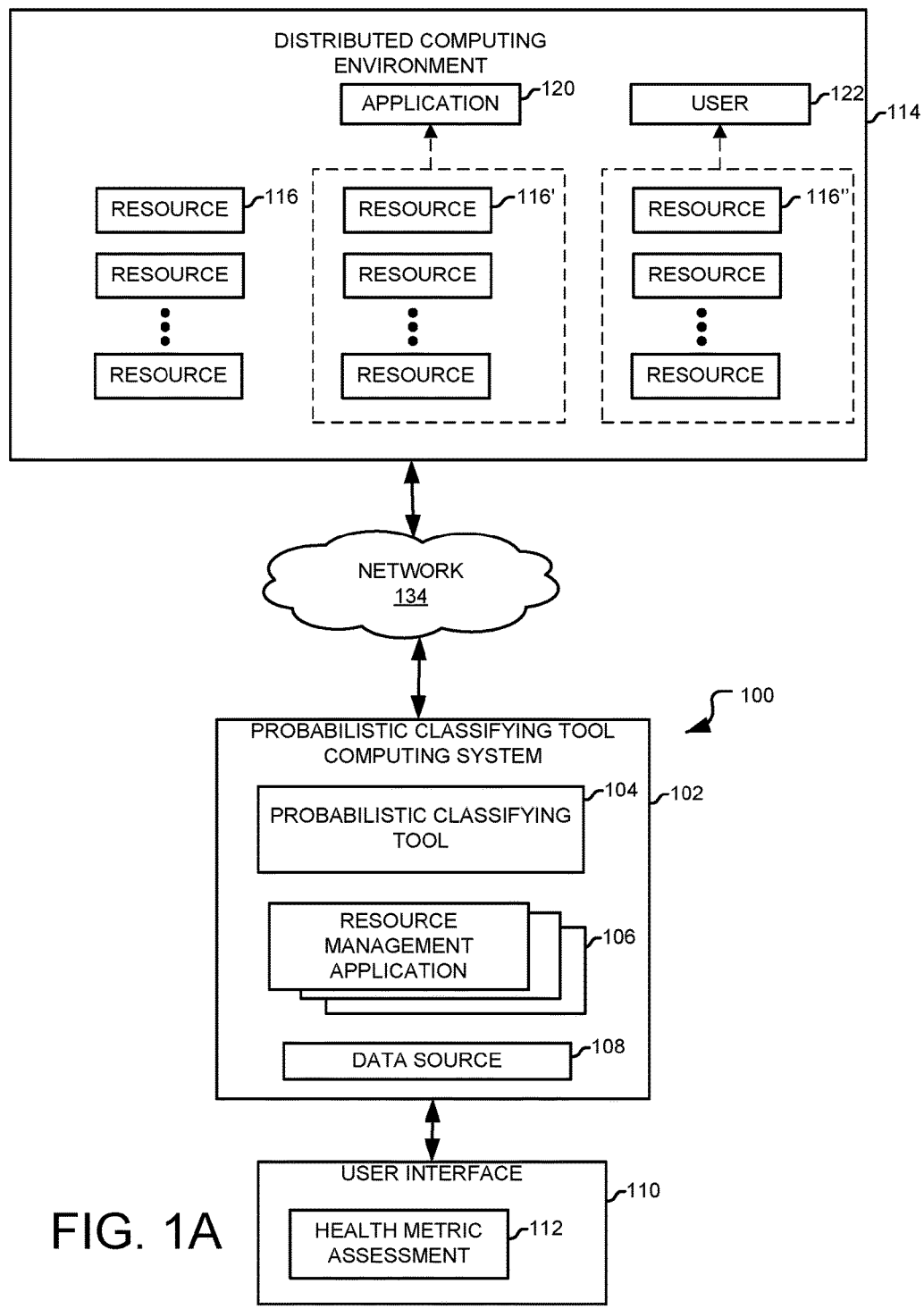
FIGS. 1A and 1B illustrate an example probabilistic classifying system for a distributed computing environment according to one embodiment of the present disclosure.
Figure 1B:
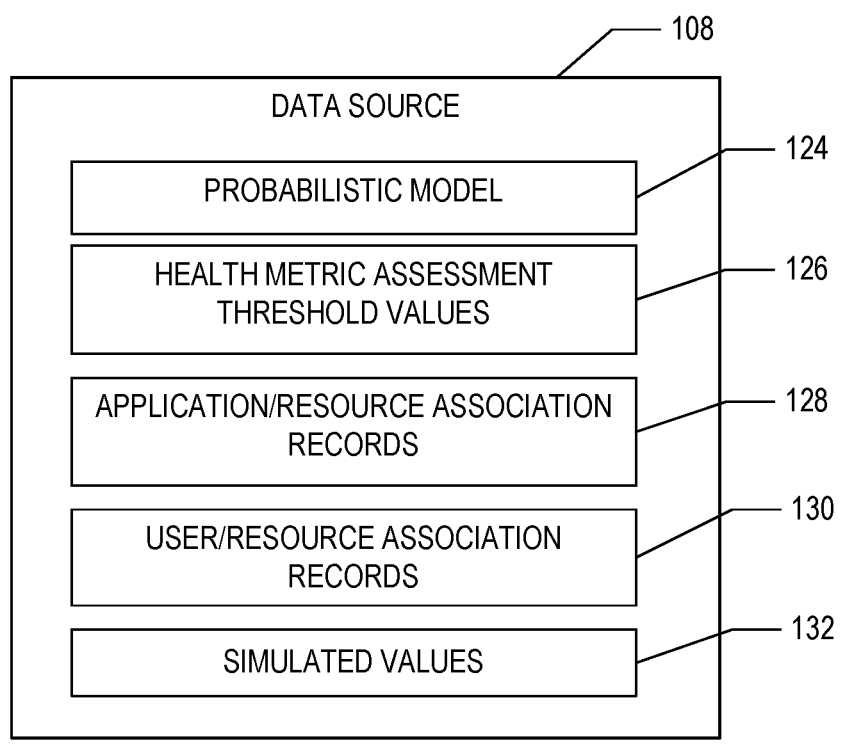

FIGS. 1A and 1B illustrate an example probabilistic classifying system 100 for a distributed computing environment that may provide a solution to these problems as well as other problems according to one embodiment of the present disclosure. The system 100 includes a probabilistic classifying tool computing system 102 that stores a probabilistic classifying tool 104, one or more resource management applications 106, and a data source 108. As will be described in detail herein below, the probabilistic classifying tool computing system 102 executes the probabilistic classifying tool 104 to generate a health metric assessment 112 associated with a distributed computing environment 114 in which the health metric assessment is determined using current and historic measured values obtained from one or more resources 116 of the distributed computing environment 114, and outputs the determined health metric assessment 112 to the user interface 110.

The probabilistic classifying tool 104 uses a probabilistic classifier to classify the health of the distributed computing environment 114 in one of multiple finite health metric assessments. For example, the health metric assessments may be ranked according to a healthy status in which the distributed computing environment is performing properly, a partially functioning status in which the distributed computing environment is functioning but at a degraded rate, and a broken status in which the distributed computing environment is essentially not functional. The health metric assessment 112 may be useful for indicating an operational health of the distributed computing environment 114. For example, once the system 100 determines the health metric assessment 112 for the distributed computing environment 114, the user may perform one or more remedial actions to improve the health metric assessment 112, such as fixing or replacing any broken resources 116 of the distributed computing environment 114, or modifying the configuration of the resources 116 of the distributed computing environment 114 that may have resulted in the degradation in the health of the resources 116 of the distributed computing environment 114.

In one embodiment, the system 100 may automatically implement one or more remedial actions when the health metric assessment goes to an unhealthy status (e.g., a health metric assessment other than a healthy status). For example, the system 100 may generate an alarm, such as visual or auditory alarm) to alert administrators of the distributed computing environment 114 that the health status has been degraded such that remedial actions may be taken. Although only three health metric assessments (e.g., healthy, partially functioning, and broken) are described herein, it should be understood that the system 100 may generate any finite quantity of health metric assessments, such as two or four or more health metric assessments, wherein the quantity of health metric assessments is generally based upon the desired granularity of the health status of the distributed computing environment 114.

In general, the probabilistic classifying tool 104 predicts, given one or more measured values, a probability distribution over a finite set of health metric assessments. That is, the probabilistic classifying tool 104 provides a statistical probability that the health of the distributed computing environment exists at a certain state based upon a sample of measured values obtained from the distributed computing environment 114. Any suitable type of probabilistic classifying may be used. Examples of suitable types of probabilistic classifiers include a binomial regression classifier, a logistic regression classifier, and a multilayer perceptron classifier.

In one embodiment, the system 100 uses a naive Bayes probabilistic classifying algorithm. In machine learning, naive Bayes classifiers are a family of simple probabilistic classifiers based on applying Bayes' theorem with strong (naive) independence assumptions between the features. The naive Bayes probabilistic classifier may be well adapted for assessing the health of the distributed computing environment 114 for several reasons. For one reason, the failure probability of the components of the distributed computing environment 114 are generally independent of each other and the naive Bayes probabilistic classifier is well suited for large quantities of data sets (e.g., measured values) that are essentially independent of one another. For another reason, the naive Bayes probabilistic classifier, by its nature, outputs one of multiple discrete finite outputs that is well suited for reporting one health metric assessment from among a multiple finite set of possible health metric assessments. For yet another reason, the naive Bayes probabilistic classifier can deliver results in a relatively short timeframe, which may enable its usage in real-time applications. For yet another reason, the naive Bayes probabilistic classifier can provide useful, effective results after a relatively short training cycle.

In general, the system 100 may be applied to a new distributed computing environment 114 or a currently deployed distributed computing environment 114 to train the probabilistic classifying tool 104. Because the assessment of the healthiness of the distributed computing environment is often based on user interpretation, which can vary widely over multiple users, the training can be conducted using predefined health values from the manufacturer of the distributed computing environment or from a customer survey obtained from multiple users of the distributed computing environment. The results of the training process yields a probabilistic model that can be stored in the data source 108 and accessed each time the system 100 is used to determine a health metric assessment for the distributed computing environment 114. In one embodiment, the training may be conducted during normal operation of the distributed computing environment 114. That is, the training of the probabilistic classifying tool 104 may be conducted to generate and/or update the probabilistic model after one or more applications are deployed on the distributed computing environment 114.

Embodiments of the present disclosure may provide certain advantages not heretofore provided by traditional health monitoring systems for distributed computing environments. For example, the use of a probabilistic classifying tool provides a machine learning technique that is flexible and adaptive, while each usage may provide additional training data that improves the results provided by the system 100 with each use. Traditional techniques have often involved rule-based algorithms or hard coding (e.g., ad hoc) algorithms. However, these traditional techniques are often tightly coupled to the type of resources and their configuration in the distributed computing environment 114. Additionally, rule-based algorithms are often slow, and are generally complicated in nature in that its rule syntax is complex and difficult to maintain and/or customize, particular by a user, such as a customer, who may not be intimately aware of all of the various characteristics of the distributed computing environment 114. Hard coding algorithms can be fast, but their implementation is highly dependent upon the configuration of the distributed computing environment 114, which often varies widely from one to another and can change over time as the user changes, adds, or removes certain components from the distributed computing environment 114. Embodiments of the present disclosure provide a solution to these problems by implementing a probabilistic classifying tool that can be generically applied on distributed computing environment 114 with differing configurations and is sufficiently flexible to allow their continued used as components of the distributed computing environment are changed, added, and/or deleted from the distributed computing environment. Moreover, because its implementation is relatively generic, little or no maintenance may be required, and may require relatively little hands-on training by personnel to enable its use.

The distributed computing environment 114 in which the application 118 is deployed may be executed by the resources of multiple computing infrastructures. For example, certain computational responsibilities of the application 120 may be performed by the resources 116 configured in a first computing infrastructure, while certain storage responsibilities may be performed by the resources 116 in a second computing infrastructure. As another example, the computational and networking responsibilities of the application 120 may be executed on the resources 116 of one or more computing infrastructures configured in a certain data center location, while the storage responsibilities for the application 120 are provided by the resources 116 at another location remotely configured from the data center. While the health of a single resource 116 can be readily ascertained, obtaining the health metric assessment 112 of a group of resources 116 is often a more difficult endeavor, due at least in part to the inter-dependence of the resources 116 to one another.

The distributed computing environment 114 may be any type of computing system having multiple resources 114. For example, the distributed computing environment 114 may include a unified computing system, a fabric-based computing system, and a dynamic infrastructure. In a particular example, the distributed computing environment 114 may include a virtualized computing environment, such as a converged infrastructure (CI) as described in detail herein below. Although the illustrated distributed computing environment 114 only shows and describes resources in the form of compute, storage, and networking resources, it should be understood that other cloud computing environments may include other components, such as gateways for secure management of data, communication nodes for communication among other devices that support the overall operation of the distributed computing environment 114.

In a particular example, one or more of the computing infrastructures 110 may function with a virtual computing environment that include multiple hardware resources (e.g., hosts) that each executes one or more virtual resources (e.g., virtual objects). Computing infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large computing system environments, converged infrastructures may involve a pool of server, storage and networking capacities, typically virtualized, that can be shared by multiple applications. One particular example of a converged infrastructure includes a Vblock™ System infrastructure package available from VCE, LLC, which is headquartered in Richardson, Tex.

Example hardware resources of the converged infrastructure may include any type of hardware that provides physical resources for the virtual computing environment while the virtual objects include logical entities, such as virtual machines, virtual switches, virtual storage units, containers, and other forms of partitioning. Virtual objects may also include logical configuration constructs, such as storage partitions, port groups, virtual private clouds, virtual local area networks (LANs), private virtual data centers (PVDCs), that may be individually allocated to one or more users. These hardware and virtual resources function in a collaborative manner to provide one or more services for the users. Virtual computing environments may also be embodied as a cloud computing environment. Whereas certain computing systems generally include localized, stand-alone structures, a cloud computing environment usually includes networked components which may be in one or more remotely configured computing systems that function in a collaborative manner to provide delegated services for multiple users over a diverse geographic region.

The resources 116 of the distributed computing environment 114 may be managed by one or more resource management applications 106. Generally speaking, each resource management application 106 communicates with certain resources 116 of the distributed computing environment 114 to obtain status information, report the status information to a user, and in certain cases, manipulate the operation of those resources 116. For an example in which the distributed computing environment 114 includes a virtualized computing environment, the compute resources may be managed by a resource management application 106, such as a Unified Compute System Management (UCSM) application that is available from Cisco Systems, or a ViPR/SMIS™ application, which is available from EMC Corporation, in Hopkinton, Mass. For another example, hypervisor components of the distributed computing environment 114 may be managed by a vCenter Server™ that is available from VMware Corporation.

The data source 108 stores one or more probabilistic models 124, health metric assessment threshold values 126, application/resource association records 128, user/resource association records 130, and one or more simulated values 132. The probabilistic models 124 are generated by the probabilistic classifying tool 104 when trained using an initial set of measured values of the resources 116. The health metric assessment threshold values 126 may be used by the probabilistic classifying tool 104 to determine whether a determined health metric assessment has exceeded a specified threshold in order to perform one or more remedial actions. The application/resource association records 128 and the user/resource association records 130 may be used by the probabilistic classifying tool 104 to associate those resources 116 in the distributed computing environment 114 that are associated with the application 120 or the user 122, respectively. The simulated values 132 may be used by the probabilistic classifying tool 104 to generate a probabilistic model 124 using values that simulate measured values of a partially deployed or a fully deployed distributed computing environment 114.

The probabilistic classifying tool computing system 102 and the computing infrastructures 110 in the distributed computing environment 112 communicate with one another in any suitable manner, such as using wireless, wired, and/or optical communications. In one embodiment, the probabilistic classifying tool computing system 102 and the computing infrastructures 110 communicates with one another using a communication network 134, such as the Internet, an intranet, or another wired and/or wireless communication network. In another embodiment, the probabilistic classifying tool computing system 102 and the computing infrastructures 110 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the probabilistic classifying tool computing system 102 and the computing infrastructures 110 may communicate with one another without the use of a separate and a distinct network.

Figure 2A:
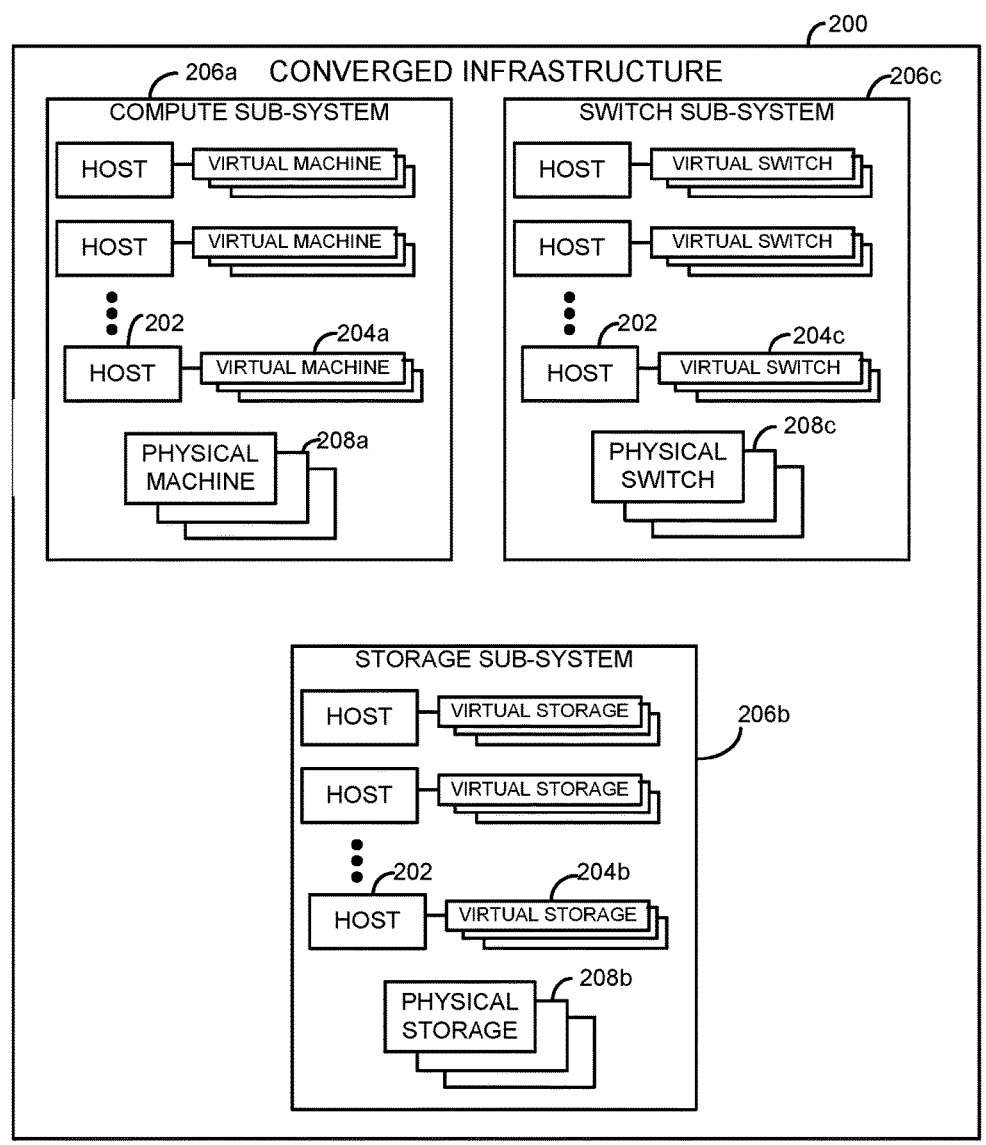
FIG. 2A illustrates an example converged infrastructure that may be implemented as one computing infrastructure in the cloud computing environment of FIG. 1A according to the teachings of the present disclosure.

FIG. 2A illustrates an example converged infrastructure 200 that may be implemented as one computing infrastructure 110 in the distributed computing environment 112 of FIG. 1A according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure. For example, the converged infrastructure 200 may include one or more physical machines 208a, physical switches 208c, and/or physical storage objects 208b in addition to, or in place of the virtual machines 204a, virtual switch objects 204c, and/or the virtual storage objects 204b as shown in FIG. 2A.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments, such as a computer cluster, computing grid, blade array, converged infrastructure, hyperconverged infrastructure, and/or other computing infrastructure may be managed using the teachings of the present disclosure. For example, a converged infrastructure 200 such as that shown includes components found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that a cloud computing environments, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
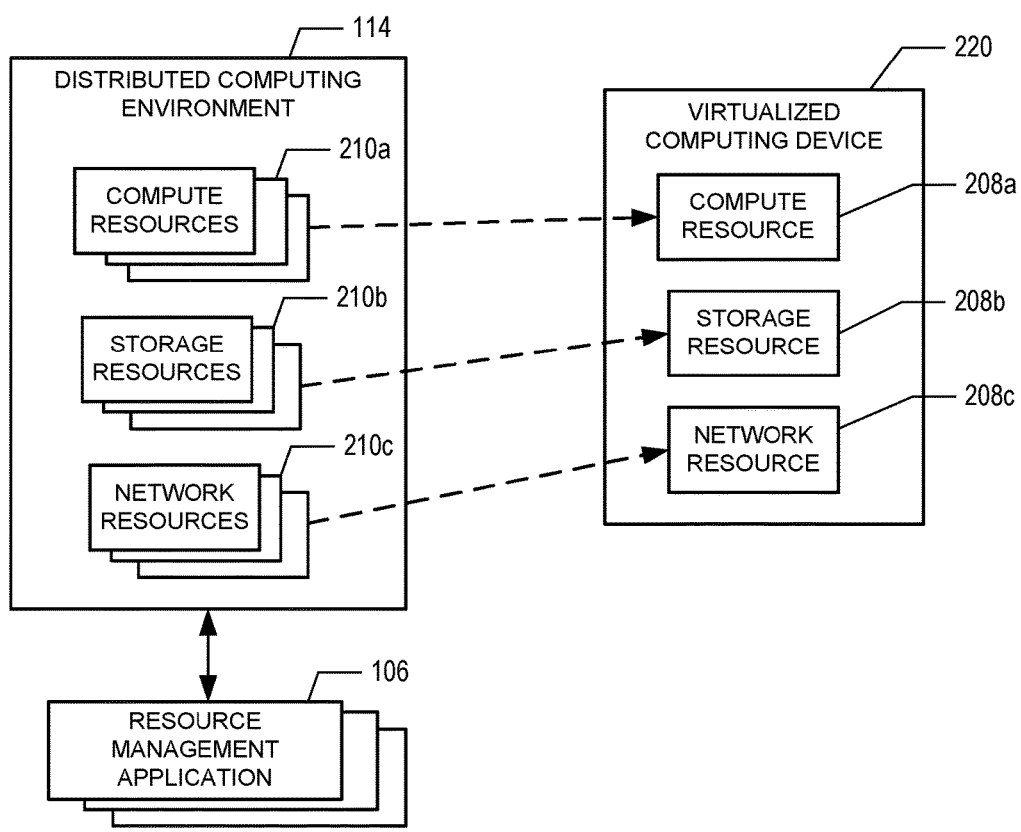
FIG. 2B illustrates an example host implemented on each converged infrastructure of FIG. 2A according to one aspect of the present disclosure.

FIG. 2B illustrates how an example virtualized computing device 220 may be created from the CI of FIG. 2A according to one aspect of the present disclosure. The virtualized computing device 220 is a logical construct that mimics or otherwise simulates the operation of a bare-metal computing machine, such as a personal computer, such as a laptop or notebook computer, a workstation, or other processing device such as a personal digital assistant or a tablet computer. For example, the virtualized computing device 220 may be used to execute individual stand-alone applications, such as spreadsheet applications, word processing applications, web browser applications, and the like. The virtualized computing device 220 may also be used to execute at least a portion of a distributed application, such as one that may consume the workload of multiple virtualized computing devices 220.

In general, the CI 200 of FIG. 2A provides virtualized resources as pools in which individual resources in each pool may be selected for inclusion in the virtualized computing device 220. For example, the CI 200 may provide a VM pool 210a comprising at least a portion of the VMs 204a and/or a portion of the physical (e.g., non-virtualized) resources 208a from the compute sub-system 206a, a storage pool 210b comprising at least a portion of the virtual storage units 204b and/or a portion of the physical (e.g., non-virtualized) resources 208b of the storage sub-system 206b, and a switch pool 210c comprising at least a portion of the virtual switches 204c and/or a portion of the physical (e.g., non-virtualized) resources 208c of the switch sub-system 206c. Allocation of one or more of each of the VMs 204a, the virtual storage units 204b, and the virtual switches 204c may be provided by one or more other resource management applications, such as a vCenter Server™ application that is available from VMware Corporation.

Figure 3:
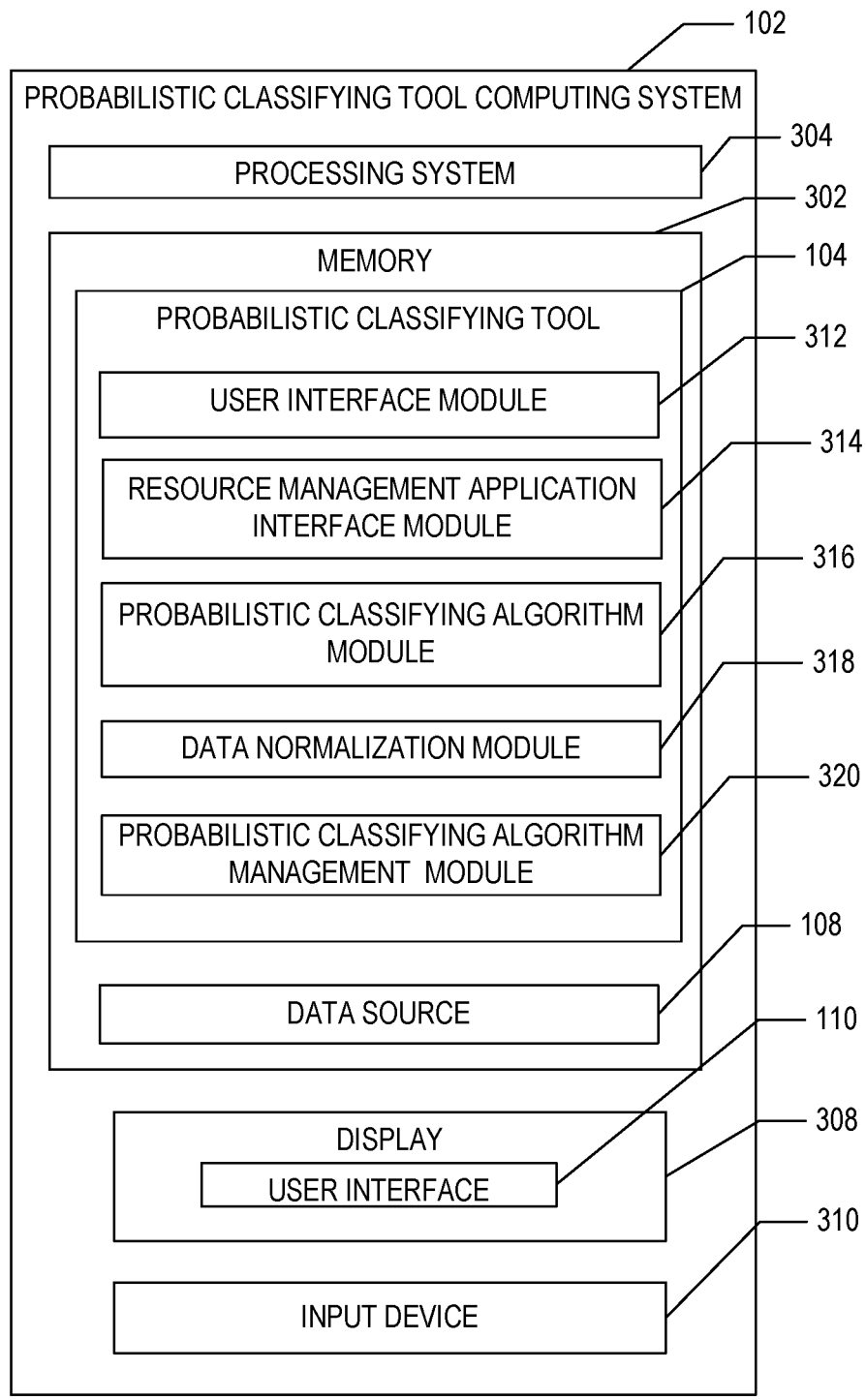
FIG. 3 is a block diagram depicting an example resource probabilistic classifying tool executed on the probabilistic classifying tool computing system according to one embodiment of the present disclosure.

Referring now in more detail to FIG. 3, a block diagram of an example probabilistic classifying tool 104 executed on the probabilistic classifying tool computing system 102, is depicted according to one aspect of the present disclosure. The probabilistic classifying tool 104 is stored in a memory 302 (e.g., computer readable media) and executed on a processing system 304 of the computing system 102. The computing system 102 may include any type of computing system, such as one or more management computing systems, personal computers, mobile computers and/or other mobile devices, and other hosts. Additionally, the processing system 304 includes one or more processors that execute instructions of the probabilistic classifying tool 104 and/or the element management applications 104.

The probabilistic classifying tool 104 is stored in a memory 302 (i.e., non-transitory computer readable medium) and is executed on a processing system 304 of the computing system 102. The memory 302 may include volatile media, nonvolatile media, removable media, non-removable media, and/or another available medium. By way of example and not limitation, memory 302 comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the operations management computing system 102 also includes a user interface 110 (e.g., a graphical user interface (GUI) or a command line interface (CLI)) displayed on a display 308, such as a computer monitor, for displaying data. The operations management computing system 102 also includes an input device 310, such as a keyboard or a pointing device (e.g., a mouse, trackball, pen, or touch screen) to enter data into or interact with the user interface 110. According to one aspect, the probabilistic classifying tool 104 includes instructions or modules that are executable by the processing system 302 as will be described in detail herein below.

A user interface module 312 facilitates the receipt of input data and/or output data from or to a user, respectively. In one example, the user interface module 312 displays a list of discovered resources 114 and one or more configuration settings associated with each discovered resource 114. As another example, the user interface module 306 may generate the user interface 312 for receiving user input, such as to receive identification of a particular application 118 and/or a computing infrastructure 110 from which the discovery process is to be performed. In another example, the user interface 312 may also receive user input for manipulating or otherwise modifying the operation of the probabilistic classifying tool 104. The user interface module 312 also displays one or more selectable fields, editing screens, and the like for receiving the user input from the user.

A resource management application interface module 314 communicates with one or more resource management applications 106 to administer a discovery process for the resources 114 associated with the application 118 and to perform various management operations on the resources 114 of the distributed computing environment 114. For example, the resource management application interface module 314 may communicate with a netflow collector element management application to discover those resources 114 that may be allocated to execution of the application 118. Additionally, the resource management application interface module 314 may communicate with one or more other resource management applications, such as a vCenter Server™ application to obtain configuration information associated with each compute resource 114 used to execute the application 118.

A probabilistic classifying algorithm module 316 processes measured values obtained from the resources of the distributed computing environment 114 to classify the distributed computing environment, or a portion of the distributed computing environment, according to one of multiple finite health metric assessments. Any suitable type of probabilistic classifying algorithm may be used, such as a naive Bayes probabilistic classifier that functions according to the Naïve Bayes theorem. The measured values may be received directly from the resources (e.g., hardware resources or virtual objects) of the distributed computing environment 114, or they may be obtained from the resource management application module 314. For example, certain resource management applications 108 that manage the resources of the distributed computing environment 114 may be queried to obtain measurement data associated with each of the resources. Additionally, certain resource management applications 108 may maintain (e.g., store) certain characteristics about the resources that they manage that may be useful for determining a health metric assessment for the distributed computing environment 114.

In situations where the measured values are obtained directly from a resource, the probabilistic classifying algorithm module 316 may communicate directly with that resource or communicate indirectly with that resource via the resource management application interface module 314 to obtain the measured values. The probabilistic classifying algorithm module 316 may obtain the measured values via various sources. For example, the probabilistic classifying algorithm module 316 may interface with a task manager service executed on the resource to obtain measured values, such as processing load, throughput (bandwidth), memory usage, and the like. Additionally, the probabilistic classifying algorithm module 316 may communicate with one or more other processes executed on the resource to obtain other measured values, such as an ambient temperature or humidity that the resource is currently operating in.

A data normalization module 318 receives measured data from the distributed computing environment 114 and converts the data into a standardized format to be processed by the probabilistic classifying algorithm module 316. In general, the data normalization module 318 obtains data in disparate formats, which may often be device specific or vendor specific, and transforms the data into a readily consumable, common format. For example, the data normalization module 318 may transform data associated with a first memory usage level (e.g., percentage of total memory used) to that of a second memory usage level (e.g., total, cached, available, etc.) such that any ensuing analysis and correlation may be provided using a common measured value. The data normalization module 318 may also be configured to obtain the data from disparate sources, such as from routers that provide the data in packetized form (e.g., TCP/IP packets), text documents, and/or audio/video generation devices, such as microphones and/or video cameras.

A probabilistic classifying algorithm monitoring module 320 obtains health metric assessments on an ongoing basis and may perform one or more remedial actions when a determined health metric assessment exceeds a specified threshold. For example, the probabilistic classifying algorithm monitoring module 320 may communicate with the probabilistic classifying algorithm module 316 to obtain a health metric assessment on a continual basis or in response to a triggering event (e.g., when a resource is added, deleted, or modified, etc.), compare the obtained health metric assessment with a threshold value, and if the obtained health metric assessment exceeds that threshold value, perform one or more remedial actions. The probabilistic classifying algorithm monitoring module 320 may perform any suitable remedial action, such as generating an alarm in the form of a message that is delivered to the user via the user interface 110. Moreover, the user interface 110 may display the alarm on the display 308 and/or generate an audible alarm as sound to be heard by the user.

In one embodiment, the probabilistic classifying algorithm monitoring module 320 may perform a remedial action that includes automatically modifying the resources. For example, when the health metric assessment is shown to have a reduced status as a result of a change to a particular resource, the probabilistic classifying algorithm module 316 may automatically revert (e.g., back-out) the change and restrict further modifications to the resources until the reason for the fault is determined. For example, the probabilistic classifying algorithm module 316 may display a selectable button on the user interface 110 that alerts the user of a reduced health metric assessment, requests manual intervention to analyze why the reduced health metric assessment occurred, and upon selection by the user, allows additional modifications to the resources of the distributed computing environment, or the portion of the resources of the distributed computing environment that are monitored by the system 100.

It should be appreciated that the modules described herein are provided only as examples, and that the probabilistic classifying tool 104 may have different modules, additional modules, or fewer modules than those described herein. For example, one or more modules as described in FIG. 3 may be combined into a single module. As another example, certain modules described herein may be encoded on, and executed on other computing systems, such as on one of the resources 116 of the distributed computing environment 114.

Figure 4A:
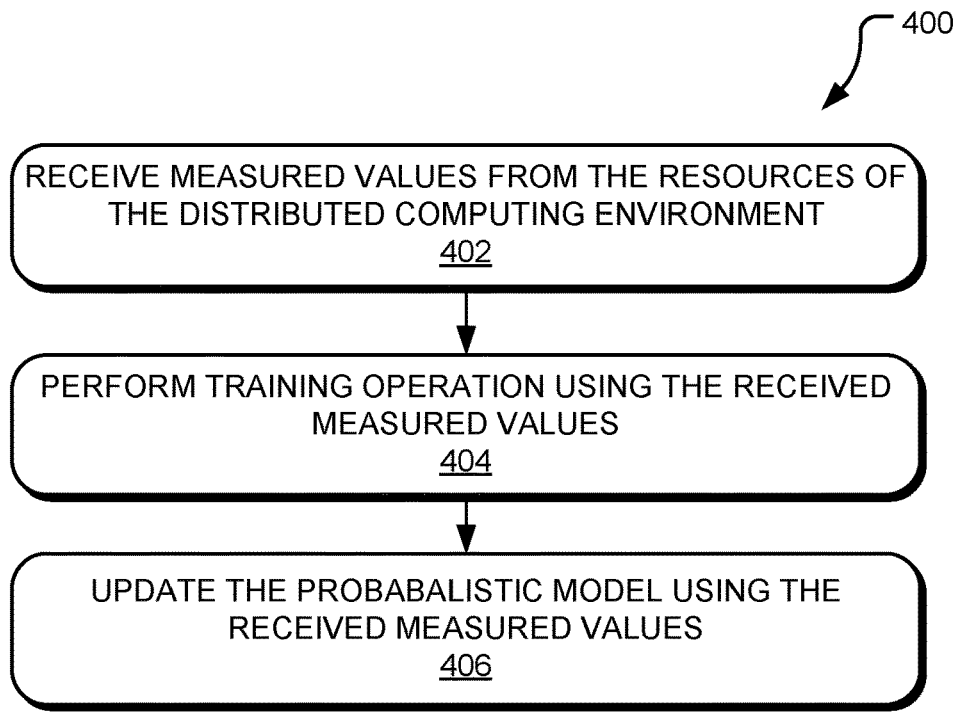
FIG. 4A illustrates an example process that may be performed by the resource probabilistic classifying tool to train a probabilistic model according to one embodiment of the present disclosure.

FIG. 4A illustrates an example process that may be performed by the resource probabilistic classifying tool 104 to train the probabilistic model 124 according to one embodiment of the present disclosure. Although the example process described herein below is directed to the resources implemented in a distributed computing environment, it is also contemplated that the features of the process may also be adaptable for use with other types computing environments, such as those that do not operate in a distributed computing environment.

At step 402, the probabilistic classifying tool 104 receives measured values from each of the resources 116 of the distributed computing environment 114. In one embodiment, the probabilistic classifying tool 104 received measured values from each of a subset of resources 116 of the distributed computing environment 114, such as those resources 116 used to support one or more applications in the distributed computing environment 114, and/or those resources 116 leased to a particular user of the distributed computing environment 114. The measured values may be received directly from the resources 116, or they may be obtained from one or more resource management applications 108 that manage the operation of the resources 116. Additionally the probabilistic classifying tool 104 may also normalized the received measured values to put them in a common format.

At step 404, the probabilistic classifying tool 104 performs a training operation using the received measured values. The training operation may be performed at any suitable time during the serviceable life of the distributed computing environment 114. The training operation may be conducted following manufacture and before any applications are deployed on the distributed computing environment 114. The training operation may also be performed after one or more applications are deployed on the distributed computing environment 114. For example, the training operation may be performed whenever one or more of the resources in the distributed computing environment 114 are deleted, modified (e.g., re-configured), and/or added.

In general, the probabilistic classifying tool predicts, given one or more measured values, a probability distribution over a finite set of health metric assessments. That is, the probabilistic classifying tool provides a statistical probability that the health of the distributed computing environment exists at a certain state based upon a sample of measured values obtained from the distributed computing environment 114. The probabilistic classifying tool may be any type that generates a probability distribution over a finite set of health metric assessments. Examples of such probabilistic classifier includes binomial regression classifiers, logistic regression classifiers, and multilayer perceptron classifiers. All of these probabilistic classifiers share a common feature in that they are trained using a sample set of data points to generate a probabilistic model from which future health metric assessments may be generated. The probabilistic model generally includes statistical inference information that can be compared with measured values obtained in the future to generate the health metric assessment. Additionally, those measured values that are obtained in the future may also be used to update or enhance the probabilistic model. That is, actual measured values obtained to generate a health metric assessment may also be used to further train the probabilistic classifying tool such that the accuracy of the health metric assessments obtained from the probabilistic classifying tool may be iteratively enhanced.

In one embodiment, the probabilistic classifying tool 104 may perform the training operation using simulated values. To perform the training operation using simulated values, simulated values may be created that approximate the measured values that would be expected to exist during normal operating conditions. For example, following manufacture and before deployment of applications on the distributed computing environment 114, actual measured values of certain types of resource loading (e.g., processor loading measured in million instructions per second (MIPS), memory usage levels, throughput measured in input-output operations per second (IOPS), etc.) may be relatively difficult to obtain. Therefore, the simulated values may be used to provide a benchmark for training the probabilistic classifying tool when no actual measured values may be available. Thereafter, the probabilistic classifying tool 104 updates the probabilistic model 124 according to the values obtained from the training operation in step 406.

Steps 402 through 406 may be repeatedly be performed on a distributed computing environment 114, such as to iteratively improve the accuracy of any health metric assessments generated from the probabilistic model 124, or on other distributed computing environments. Nevertheless, when no further probabilistic classifying tool 104 is no longer needed or desired, the process ends.

Figure 4B:
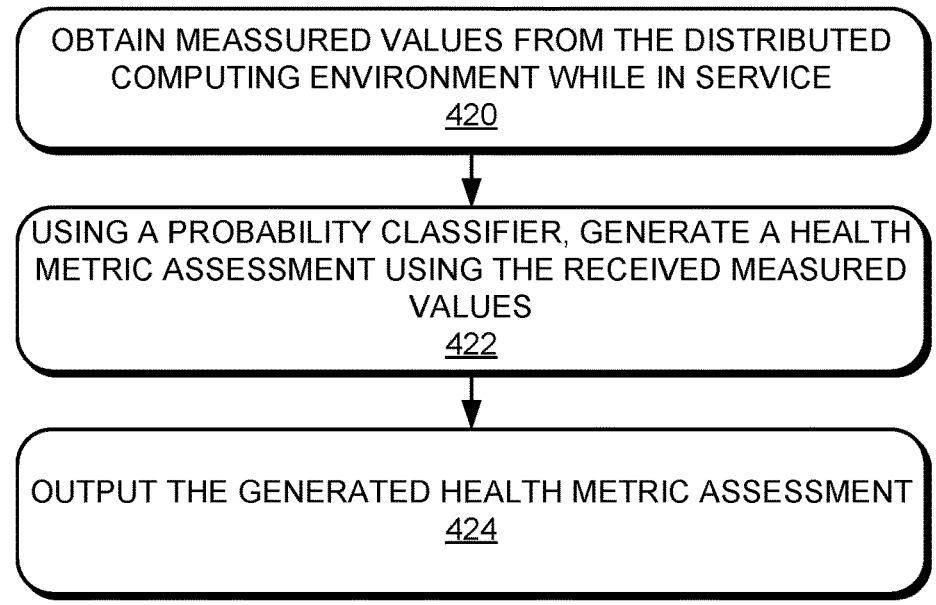
FIG. 4B illustrates an example process that may be performed by the resource probabilistic classifying tool to generate a health metric assessment for the resources of a distributed computing environment according to one embodiment of the present disclosure.

FIG. 4B illustrates an example process that may be performed by the resource probabilistic classifying tool 104 to generate a health metric assessment for the resources 116 of a distributed computing environment 114 according to one embodiment of the present disclosure. In general, the process described in FIG. 4B is performed after the training operation of FIG. 4A has been performed to update the probabilistic model 124. Nevertheless, the process described in FIG. 4B and the training operation described in FIG. 4A may be performed in any order and number of times. For example, the training operation may be performed by the manufacturer of the distributed computing environment 114 following fabrication of the distributed computing environment 114 such that the purchaser may be provided with a probabilistic model 124 from which health metric assessments may be generated during the serviceable life of the distributed computing environment. As another example, software or code used to execute the training operation may be provided to the customer so that they may be able to perform the training operation at ongoing intervals during the serviceable life of the distributed computing environment 114.

At step 420, the probabilistic classifying tool 104 is executed to continually obtain measured values from the distributed computing environment for generating ongoing health metric assessments using the received measured values at step 422. That is, the probabilistic classifying tool 104 may generate the health metric assessment by comparing the received measured values against statistically inferred values generated from previously obtained measured values of the distributed computing environment.

Thereafter at step 424, the probabilistic classifying tool 104 outputs the generated health metric assessment. In one embodiment, the probabilistic classifying tool 104 transmits a message to the user interface 110 that includes the generated health metric assessment. In another embodiment, the probabilistic classifying tool 104 may perform one or more remedial actions in the event that the generated health metric assessment exceeds a specified threshold value. Examples of potential remedial action include reverting one or more changes that were made to the resources that were performed prior to the degraded health metric assessment, inhibiting further modification to the resources 116, and performing one or more other modifications to the resources 116, such as adding, modifying (e.g., re-configuring), and/or deleting) certain other resources in the distributed computing environment 114.

The previous steps may be repeatedly performed to acquire additional health metric assessments during the serviceable life of the distributed computing environment 114. For example, steps 420 through 424 may be performed continuously (e.g., background mode) so that the overall health of the distributed computing environment 114 may be continually monitored. Nevertheless, when use of the probabilistic classifying tool 104 is no longer needed or desired, the process ends.

Although FIGS. 4A and 4B describe one example of a process that may be performed by the probabilistic classifying tool 104 for obtained health metrics for a distributed computing environment, the features of the disclosed process may be embodied in other specific forms without deviating from the spirit and scope of the present disclosure. For example, the probabilistic classifying tool 104 may perform additional, fewer, or different operations than those operations as described in the present example. As another example, the steps of the process described herein may be performed by a system other than the probabilistic classifying tool 104, which may be, for example, one of the resources 116 in the distributed computing environment 114.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
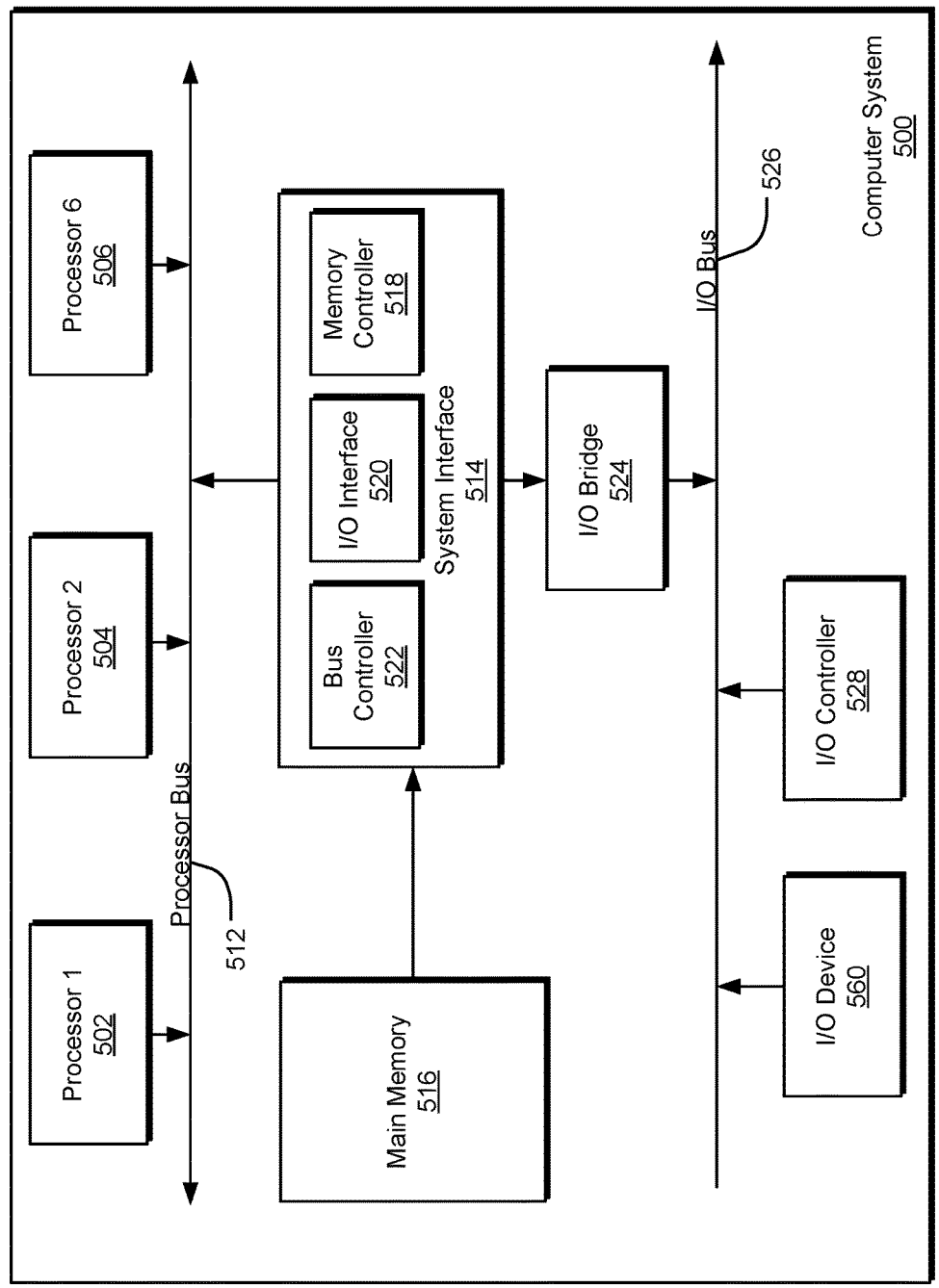
FIG. 5 is a block diagram illustrating an example of a computing device or computer system which may be used in implementing the embodiments of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 525 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A probabilistic classifying system for a distributed computing environment, the system comprising:
   a computing system comprising at least one processor and at least one memory to store instructions that are executed by the at least one processor to:
      train a probabilistic model using machine learning by using one of predefined health values from a manufacturer of the distributed computing environment and a customer survey obtained from a plurality of users of the distributed computing environment to generate the probabilistic model;
      obtain in real-time a plurality of measured values associated with operation of a plurality of resources of a distributed computing environment;
      convert and normalize each of the plurality of measured values having a first, disparate format to a second, common format that may analyzed by the probabilistic classifying system;
      generate a health metric assessment using a probabilistic classifier, the health metric assessment comprising one of a plurality of finite health metric assessments, wherein the probabilistic classifier generates the health metric assessment according to the obtained plurality of measured values, the probabilistic model, and a statistical inference upon at least a portion of a plurality of previously obtained measured values of the resources of the distributed computing environment having the second, common format; and
      perform at least one remedial action when the health metric assessment exceeds a specified threshold, the at least one remedial action comprising displaying a message on a user interface, displaying a selectable button on the user interface that alerts that the health metric assessment exceeds the specified threshold, and automatically modifying at least one particular resource of the plurality of resources of the distributed computing environment.

2. The probabilistic classifying system of claim 1, wherein the instructions are further executed to perform a training operation for the probabilistic classifying tool using the previously obtained measured values to generate the statistical inference.

3. The probabilistic classifying system of claim 2, wherein the previously obtained measured values comprise simulated values, wherein the training operation is conducted following manufacture of the distributed computing environment and before any applications are deployed on the distributed computing environment.

4. The probabilistic classifying system of claim 1, wherein the measured values comprise at least one of a processing load of one of the resources, a communication throughput of one of the resources, a memory usage of one of the resources, an ambient temperature that the resource is currently operating in, and a humidity that the resource is currently operating in.

5. The probabilistic classifying system of claim 1, wherein the probabilistic classifier comprises a naïve Bayes probabilistic classifier.

6. The probabilistic classifying system of claim 1, wherein the instructions are further executed to obtain a health metric assessment for a portion of the resources of the distributed computing environment, wherein the portion of the resources are associated with an application executed on the distributed computing environment.

7. The probabilistic classifying system of claim 1, wherein the instructions are further executed to generate the health metric assessment on an ongoing basis.

8. A probabilistic classifying method comprising:
   training, using at least one processor, a probabilistic model using machine learning by using one of predefined health values from a manufacturer of a distributed computing environment and a customer survey obtained from a plurality of users of the distributed computing environment to generate the probabilistic model;
   obtaining in real-time, using an operations management application stored on a non-transitory medium and executed by the at least one processor, a plurality of measured values associated with operation of a plurality of resources of a distributed computing environment;

converting and normalizing, using the at least one processor, each of the plurality of measured values having a first, disparate format to a second, common format that may analyzed by the at least one processor;

generating, using the at least one processor, a health metric assessment using a probabilistic classifier, the health metric assessment comprising one of a plurality of finite health metric assessments, wherein the probabilistic classifier generating the health metric assessment according to the obtained plurality of measured values, the probabilistic model, and a statistical inference upon at least a portion of a plurality of previously obtained measured values of the resources of the distributed computing environment having the second, common format; and performing, using the at least one processor, at least one remedial action when the health metric assessment exceeds a specified threshold, the at least one remedial action comprising displaying a message on a user interface, displaying a selectable button on the user interface that alerts that the health metric assessment exceeds the specified threshold, and automatically modifying at least one particular resource of the plurality of resources of the distributed computing environment.

9. The probabilistic classifying method of claim 8, further comprising performing a training operation using the previously obtained measured values to generate the statistical inference.

10. The probabilistic classifying method of claim 9, further comprising conducting the training operation following manufacture of the distributed computing environment and before any applications are deployed on the distributed computing environment, wherein the previously obtained measured values comprise simulated values.

11. The probabilistic classifying method of claim 8, wherein the probabilistic classifier comprises a naïve Bayes probabilistic classifier.

12. The probabilistic classifying method of claim 8, further comprising obtaining the health metric assessment for a portion of the resources of the distributed computing environment, wherein the portion of the resources are associated with an application executed on the distributed computing environment.

13. The probabilistic classifying method of claim 8, further comprising generating the health metric assessment on an ongoing basis.

14. A non-transitory, computer readable storage medium having instructions stored thereon that when executed by at least one processor, cause the at least one processor to perform operations comprising:

training a probabilistic model using machine learning by using one of predefined health values from a manufacturer of a distributed computing environment and a customer survey obtained from a plurality of users of the distributed computing environment to generate the probabilistic model;

obtaining in real-time a plurality of measured values associated with operation of a plurality of resources of a distributed computing environment;

converting and normalizing each of the plurality of measured values having a first, disparate format to a second, common format that may analyzed by the at least one processor;

generating a health metric assessment using a probabilistic classifier, the health metric assessment comprising one of a plurality of finite health metric assessments, wherein the probabilistic classifier generating the health metric assessment according to the obtained plurality of measured values, the probabilistic model, and a statistical inference upon at least a portion of a plurality of previously obtained measured values of the resources of the distributed computing environment having the second, common format; and performing at least one remedial action when the health metric assessment exceeds a specified threshold, the at least one remedial action comprising displaying a message on a user interface, displaying a selectable button on the user interface that alerts that the health metric assessment exceeds the specified threshold, and automatically modifying at least one particular resource of the plurality of resources of the distributed computing environment.

15. The non-transitory, computer readable storage medium of claim 14, wherein the probabilistic classifier comprises a naïve Bayes probabilistic classifier.

16. The non-transitory, computer readable storage medium of claim 14, the operations further comprising obtaining the health metric assessment for a portion of the resources of the distributed computing environment, wherein the portion of the resources are associated with an application executed on the distributed computing environment.

17. The non-transitory, computer readable storage medium of claim 14, the operations further comprising generating the health metric assessment on an ongoing basis.

* * * * *